United States Patent [19]
Shang et al.

[11] Patent Number: 5,941,980
[45] Date of Patent: Aug. 24, 1999

[54] APPARATUS AND METHOD FOR PARALLEL DECODING OF VARIABLE-LENGTH INSTRUCTIONS IN A SUPERSCALAR PIPELINED DATA PROCESSING SYSTEM

[75] Inventors: Shi-Sheng Shang, Kaohsiung; Dze-Chaung Wang, Taichung, both of Taiwan

[73] Assignee: Industrial Technology Research Institute, Hsinchu, Taiwan

[21] Appl. No.: 08/805,660

[22] Filed: Feb. 27, 1997

Related U.S. Application Data

[63] Continuation-in-part of application No. 08/693,376, Aug. 5, 1996, Pat. No. 5,724,422.

[51] Int. Cl.$^6$ .................................................. G06F 9/30
[52] U.S. Cl. ......................... 712/204; 712/23; 712/206; 712/207; 712/210; 712/212; 712/213; 712/215
[58] Field of Search ....................... 395/380, 381, 395/382, 383, 386, 388, 389; 711/125; 712/204, 205, 206, 207, 210, 212, 213, 23

[56] References Cited

U.S. PATENT DOCUMENTS

| | | |
|---|---|---|
| 4,539,635 | 9/1985 | Boddie et al. . |
| 4,598,358 | 7/1986 | Boddie et al. . |
| 5,202,967 | 4/1993 | Matsuzaki et al. . |
| 5,337,415 | 8/1994 | DeLano et al. . |
| 5,448,746 | 9/1995 | Eickemeyer et al. . |
| 5,450,605 | 9/1995 | Grochowski et al. ................... 395/392 |
| 5,459,844 | 10/1995 | Eickemeyer et al. . |
| 5,488,710 | 1/1996 | Sato et al. ................................ 711/125 |
| 5,600,806 | 2/1997 | Brown et al. ........................... 395/380 |
| 5,724,422 | 3/1998 | Shang et al. ................................ 380/4 |
| 5,758,116 | 5/1998 | Lee et al. ................................ 395/386 |

OTHER PUBLICATIONS

D. Anderson, Pentium Processor System Architecture, 2nd ed. (1995); Intel, A Tour of the Pentium® Pro Processor Microarchitecture (http://intel.com/procs/ppro/info/p6 white/index.htm).

*Primary Examiner*—William M. Treat
*Attorney, Agent, or Firm*—Proskauer Rose LLP

[57] ABSTRACT

A process is provided for determining the beginning and ending of each instruction of a variable length instruction. Data lines are stored in a first memory area which illustratively is an instruction cache. Each data line comprises a sequence of data words that are stored at sequential address in a main memory. The data lines contain multiple encoded variable length instructions that are contiguously stored in the main memory. Multiple indicators are stored in a second memory area, including one indicator associated with each data word of the data lines stored in the first memory area. Each indicator indicates whether or not its associated data word is the initial data word of a variable length instruction. A sequence of data words may be fetched from the cache. The fetched sequence of data words includes a starting data word and at least the number of data words in the longest permissible instruction. Plural indicators (i.e., a vector of indicators) are also fetched from the second memory area including one indicator associated with each of the data words of the fetched sequence. Using the indicators as delimiters of the sequence of to-be-decoded instructions, one or more non-overlapping subsequences of the sequence of data words are identified, wherein each subsequence of data words is comprised in a different, sequential to-be-decoded instruction. Each subsequence of data words is then decoded as a separate instruction.

22 Claims, 5 Drawing Sheets

| INVALID/VALID | MODIFIED | DATA LINE |
|---|---|---|
| 0 | 0 | LINE U-1 |
| 0 | 0 | ... |
| 0 | 0 | LINE X+1 |
| 0 | 0 | LINE X |
| 0 | 0 | LINE X-1 |
| 0 | 0 | ... |
| 0 | 0 | LINE 0 |

|  | BIT V-1 | BIT V-2 | BIT V-3 | ... | BIT 2 | BIT 1 | BIT 0 |  |
|---|---|---|---|---|---|---|---|---|
| LINE U-1 | 0 | 0 | 0 | ... | 0 | 0 | 0 | 459 |
| ... | ... | ... | ... | ... | ... | ... | ... | |
| LINE X+1 | 0 | 0 | 0 | ... | 0 | 0 | 0 | 456 |
| LINE X | 0 | 0 | 0 | ... | 0 | 0 | 0 | 455 |
| LINE X-1 | 0 | 0 | 0 | ... | 0 | 0 | 0 | 454 |
| ... | ... | ... | ... | ... | ... | ... | ... | |
| LINE 0 | 0 | 0 | 0 | ... | 0 | 0 | 0 | |

FIG. 5

| | BYTE V-1 | BYTE V-2 | BYTE V-3 | ... | BYTE 2 | BYTE 1 | BYTE 0 | |
|---|---|---|---|---|---|---|---|---|
| LINE U-1 | 0000 0000 | 0000 0000 | 0000 0000 | ... | 0000 0000 | 0000 0000 | 0000 0000 | 359 |
| ... | ... | ... | ... | ... | ... | ... | ... | |
| LINE X+1 | 1000 0100 | 1010 0111 | 0001 1010 | ... | 1101 1011 | 1110 0111 | 0101 0000 | 356 |
| LINE X | 0101 1110 | 1101 1011 | 1100 0110 | ... | 1011 1111 | 1100 0001 | 1001 0110 | 355 |
| LINE X-1 | 0101 0111 | 1100 1010 | 0110 0001 | ... | 1001 0010 | 1000 0110 | 1100 0110 | 354 |
| ... | ... | ... | ... | ... | ... | ... | ... | |
| LINE 0 | 0100 0011 | 0011 1010 | 0110 1001 | ... | 1011 0110 | 1100 0111 | 0111 1010 | 351 |

FIG. 6

| | BIT V-1 | BIT V-2 | BIT V-3 | ... | BIT 2 | BIT 1 | BIT 0 | |
|---|---|---|---|---|---|---|---|---|
| LINE U-1 | 0 | 0 | 0 | ... | 0 | 0 | 0 | 459 |
| ... | ... | ... | ... | ... | ... | ... | ... | |
| LINE X+1 | 0 | 0 | 0 | ... | 0 | 0 | 0 | 456 |
| LINE X | 0 | 0 | 0 | ... | 0 | 0 | 0 | 455 |
| LINE X-1 | 0 | 0 | 0 | ... | 0 | 0 | 0 | 454 |
| ... | ... | ... | ... | ... | ... | ... | ... | |
| LINE 0 | 0 | 0 | 0 | ... | 0 | 0 | 0 | |

FIG. 7

| | BIT V-1 | BIT V-2 | BIT V-3 | ... | BIT 2 | BIT 1 | BIT 0 | |
|---|---|---|---|---|---|---|---|---|
| LINE U-1 | 0 | 0 | 0 | ... | 0 | 0 | 0 | 459 |
| ... | ... | ... | ... | ... | ... | ... | ... | |
| LINE X+1 | 0 | 0 | 0 | ... | 0 | 0 | 0 | 456 |
| LINE X | 0 | 1 | 0 | ... | 0 | 0 | 0 | 455 |
| LINE X-1 | 0 | 0 | 0 | ... | 0 | 0 | 0 | 454 |
| ... | ... | ... | ... | ... | ... | ... | ... | |
| LINE 0 | 0 | 0 | 0 | ... | 0 | 0 | 0 | |

FIG. 8

| | BIT V-1 | BIT V-2 | BIT V-3 | ... | BIT 2 | BIT 1 | BIT 0 | |
|---|---|---|---|---|---|---|---|---|
| LINE U-1 | 0 | 0 | 0 | ... | 0 | 0 | 0 | 459 |
| ... | ... | ... | ... | ... | ... | ... | ... | |
| LINE X+1 | 1 | 0 | 0 | ... | 0 | 0 | 0 | 456 |
| LINE X | 0 | 1 | 0 | ... | 0 | 1 | 1 | 455 |
| LINE X-1 | 1 | 0 | 0 | ... | 1 | 0 | 1 | 454 |
| ... | ... | ... | ... | ... | ... | ... | ... | |
| LINE 0 | 1 | 1 | 0 | ... | 1 | 1 | 1 | |

APPARATUS AND METHOD FOR PARALLEL DECODING OF VARIABLE-LENGTH INSTRUCTIONS IN A SUPERSCALAR PIPELINED DATA PROCESSING SYSTEM

This application is a continuation-in-part of Ser. No. 08/693,376 now U.S. Pat. No. 5,724,422 to Shang et al. and filed on Aug. 5, 1996.

The subject matter of this application is related to the subject matter of U.S. patent application Ser. No. 08/071,721, entitled "Memory Consistent Pre-ownership Method and System for Transferring Data Between an I/O Device and a Main Memory," filed Jun. 4, 1993 for Chang-Lun CHEN, et al. The above-noted patent application is assigned to the assignee of this application and is incorporated herein by reference.

RELATED APPLICATION

1. Field of the Invention

This invention relates generally to superscalar processors which utilize variable-length instructions. More particularly, the present invention relates to a memory and method for storing and utilizing the boundary information of instructions within a series of instructions stored in a cache memory to enable the parallel decoding of multiple variable-length instructions.

2. Background of the Invention

Stored program control digital computers typically include a main memory for storing program instructions and data. The main memory provides program instructions and data to a functional unit, such as an arithmetic logic unit ("ALU"), floating point unit ("FPU"), etc., of a central processing unit ("CPU") for execution. Reduced instruction set computer ("RISC") CPU's, typically utilize fixed length instructions. On the other hand, complex instruction set computer ("CISC") CPU's use variable length instructions, e.g., of 1–12 bytes in the case of an x86 architecture CISC CPU (assuming that prefix codes are not counted).

Cache memories are often connected to CPUs and other functional units in order to exploit spatial and temporal locality of reference properties of instructions. Spatial locality of reference is the tendency of instructions to be sequentially stored somewhat in the same order of execution. Temporal locality of reference is the tendency of functional units to access the same instructions repeatedly. The temporal locality of reference property arises from program flow control instructions such as loops, branches and subroutines which cause the functional units to repeat execution of certain recently executed instructions. Thus, functional units tend to access repeatedly the instructions stored in the same localities in memory.

In order to exploit the spatial and temporal localization properties of instruction execution and storage, entire sequences of the localized instructions are copied from the main memory into a cache memory. Generally speaking, the data words (e.g., typically byte sized units) are organized into contiguous data lines of, for example, sixty-four data words. When an instruction is fetched, the entire data line (or lines, if the instruction bridges multiple data lines) containing the instruction is read out of main memory and written into a cache line storage location of the cache memory. Consequently, the likelihood increases that cache memories, when loaded with an entire sequence of instructions, can satisfy future accesses to the same instructions previously accessed or instructions not yet accessed (assuming that future accesses will be to other instructions corresponding to the data lines already stored in the cache memories).

The use of a cache memory increases system performance because the access time, i.e., time for fetching an instruction, for the cache memory is much lower than the slower main memory. However, in some instances, an instruction is requested that is not in the cache memory. In this case, a "cache miss" is said to occur. In the event of a cache miss, the requested instruction must be obtained from the main memory. In most cases however, due to temporal and spatial localization, the requested instruction is located in the cache memory and a "cache hit" is said to occur. A cache hit indicates that the requested information is available from the high speed cache memory. In digital computer systems, the "cache hit" rate for instructions in cache memory, due to locality of references, can be on the order of 90%.

In the historical development of CPU's, CPU's were originally designed so that their functional units received a sequence of instructions and executed each instruction one at a time. Such CPU's are referred to as "scalar" processors because they execute only one instruction at a time. The operational speed of traditional scalar processors has been pushed to its limits by advances in circuit technology, computer mechanisms, and computer architecture. However, with each new generation of computing machines, new acceleration mechanisms must be discovered for traditional scalar machines.

Modern processors commonly use a technique known as pipelining to improve performance. Pipelining is an instruction execution technique that is analogous to an assembly line. Consider that instruction execution often involves the sequential steps of fetching the instruction from memory, decoding the instruction into its respective operation and operand(s), fetching the operands of the instruction, applying the decoded operation on the operands (herein simply referred to as "executing" the instruction), and storing the result back in memory or in a register. Pipelining is a technique wherein the sequential steps of the execution process are overlapped for a subsequence of the instructions. For example, while the CPU is storing the results of a first instruction of an instruction sequence, the CPU simultaneously executes the second instruction of the sequence, fetches the operands of the third instruction of the sequence, decodes the fourth instruction of the sequence and fetches the fifth instruction of the sequence. Pipelining can thus decrease the execution time for a sequence of instructions.

Another technique for improving performance involves executing two or more instructions in parallel, i.e., simultaneously. Processors which utilize this technique are generally referred to as superscalar processors. Such processors may incorporate an additional technique in which a sequence of instructions may be executed, and results for such instructions may be stored, in a somewhat arbitrary and different order than the strictly sequential order in which the instruction sequence is stored. This is referred to as out-of-order issue and out-of-order completion, respectively.

The ability of a superscalar processor to execute two or more instructions simultaneously depends upon the particular instructions being executed. Likewise, the flexibility in issuing or completing instructions out-of-order can depend on the particular instructions to be issued or completed. There are three types of such instruction dependencies referred to as resource conflicts, procedural dependencies and data dependencies. Resource conflicts occur when two instructions executing in parallel contend to access the same resource, e.g., the system bus. Data dependencies occur when the completion of a first instruction changes the value stored in a register or memory that is later accessed by a later completed second instruction.

Data dependencies can be classified into three types referred to as "true data dependencies," "anti-dependencies" and "output data dependencies". See MIKE JOHNSON, SUPERSCALAR MICROPROCESSOR DESIGN, p. 9–24 (1991). An instruction which uses a value computed by a previous instruction has a "true" (or data) dependency on the previous instruction. An example of an output dependency is, in out-of-order completion, where first and second sequential instructions both assign the same register or memory location to different values and a third instruction that follows the first and second instructions uses the value stored in the register or memory location as an operand. The earlier (first) instruction cannot complete after the later (second) instruction or else the third instruction will have the wrong value. An example of an anti-dependency also occurs in out-of-order execution wherein a later instruction, executed out of order and before a previous instruction, may produce a value that destroys a value used by the previous instruction. As illustrations of true dependency, output dependency and anti-dependency, consider the following sequence of instructions:

(1) R3:=R3 op R5
(2) R4:=R3+1
(3) R3:=R5+1
(4) R7:=R3 op R4

Instruction (2) has a true dependency on instruction (1) since the value stored in R3, to be used as an operand in instruction (2), is determined by instruction (1). Instruction (3) has an anti-dependency on instruction (2) since instruction (3) modifies the contents of register R3. If instruction R3 is executed out of order and before instruction (2) then instruction (2) will use the wrong value stored in register R3 (in particular, the value as modified by instruction (3)). Instructions (1) and (3) have an output dependency. Instruction (1) cannot complete out-of-order and after instruction (3) because the resulting value, as determined by instruction (3), must be the last value stored in register R3, not the resulting value as determined by instruction (1), so that instruction (4) will execute on the correct operand value stored in register R3. False dependencies can be removed using a register renaming technique and a reorder buffer.

A procedural dependency occurs where execution of a first instruction depends on the outcome of execution of a previous instruction, such as a branch instruction. See MIKE JOHNSON, SUPERSCALAR MICROPROCESSOR DESIGN, p. 57–77 (1991). It is difficult to know with certainty whether or not a particular branch will be taken. (For sake of brevity, it is presumed that a branch instruction is an instruction that either causes execution to continue at some pre-specified non-sequential address or allows execution to continue in sequence at the very next sequentially following instruction. In the former case, the branch is said "to have been taken," wherein in the latter case, the branch is said "to have not been taken." Branch instructions can be more complicated including indexed branch instructions, wherein the address to which the execution continues when the branch is taken dynamically varies according to a value stored in memory or in a register. However, such indexed branch instructions are not specifically described herein.) Therefore, it is difficult to know with certainty which sequence of instructions should be executed after a branch instruction. Nevertheless, a number of branch prediction techniques can be used to predict whether or not a branch will be taken, which techniques can have an accuracy as high as 90%. Using a branch prediction technique, a prediction is made as to whether or not a branch will be taken. The sequence of instructions which would be executed if the prediction is correct is fetched and executed. However, any results of such instructions are treated as merely "speculative" until the branch instruction is in fact executed. When the branch instruction is executed, a determination is made as to whether or not the prediction was correct. If the outcome of the branch instruction was correctly predicted, the above-noted "speculative results" may be accepted. However, if the branch was incorrectly predicted, misprediction recovery steps are executed including recovering/discarding the speculative results and fetching the correct sequence of instructions for execution.

A number of techniques may be used to perform branch prediction using software and/or hardware. For instance, using a software compiler, predictions can be made from the original source code regarding whether or not branches will be taken. Also predictions can be static (unchanging during execution) or dynamic (varying during execution). Two dynamic hardware branch prediction schemes include using a 2 bit counter, as in the Pentium™ processor, or a two-level branch target buffer, as in the Pentium Pro™ processor. According to a simple branch target buffer technique, each branch instruction is initially presumed to be not taken. As each branch instruction is executed, if the branch is taken, the address to which execution branches is stored in the branch target buffer (illustratively operated as a queue). Later, each branch instruction is identified during the instruction fetch cycle. A prediction is made that the branch for each instruction will be taken to the address at the head of the branch target buffer queue. As such, one or more of the instructions located at addresses starting from the address indicated at the head of the branch target buffer queue are fetched. If the branch is not taken when the branch instruction is executed, then the prediction was incorrect. In such a case, branch mis-prediction recovery is performed and the branch target buffer queue is not updated. Alternatively, if the branch is taken when the branch instruction is executed but the address to which execution branches does not match the address at the head of the branch target buffer queue, then the branch prediction was again in error. In such a case, the new address is stored in the branch target buffer queue (at its tail) and branch misprediction recovery is carried out. On the other hand, if the branch is taken and the address to which execution branches matches the address at the head of the branch target buffer queue, then the branch was correctly predicted. The address is removed from the head of the branch target buffer queue and stored at its tail.

The instruction set of CISC processors include instructions of varying length. When contiguously packed end to end in memory, the beginning and ending of each individual CISC instruction cannot be readily identified without preliminary knowledge or indications of each instruction boundary. As such, a finite amount of time is consumed in separating the variable-length instructions during the instruction fetch operation. This finite time cannot be readily recovered by overlapping the aforenoted instruction separating steps with other instruction execution steps, because the beginning of an instruction cannot be determined until the length (and ending) of the immediately preceding instruction is determined. This disadvantage becomes more pronounced as the complexity of the instruction set architecture increases (e.g., as the number of permissible instruction lengths increases).

As the trend of processor design moves from single-issue scalar to high-performance, pipelined and superscalar systems, the demand for parallel decoding of multiple instructions arises. Decoding multiple, variable-length instructions in parallel is difficult in that the next instruction can not be decoded until the length of the previous instruction is known. Such a problem is a consideration in superscalar CISC architectures but not superscalar RISC architectures which use fixed length instructions (and therefore it is a simple matter to determine where each instruction begins and ends).

In CISC architectures, an instruction cache may be employed to receive the instructions from memory and hold the instruction until a functional unit is ready to accept the instruction. The instructions may thus be more quickly fetched for input to a decoder. The decoder decodes the instruction prior to input to the functional unit for execution. The advent of superscalar (e.g., multiple functional unit) microprocessors such as the Intel™ Pentium Pro™, places an emphasis on utilizing each functional unit during as many clock cycles as possible (no functional unit should be unnecessarily idle). This has led to the development of several schemes for decoding variable-length instructions in a superscalar, pipelined environment.

A prefetcher may be provided for fetching instructions from the cache or the main memory. The contents of the prefetcher typically indicate the starting address in cache from which the next instruction or instructions are to be fetched. The design of the prefetcher takes into account the employment of fixed-length instructions or variable-length instructions as may be the case in the particular system.

In prior art processors utilizing variable-length instructions, when the instruction cache is first loaded, the prefetcher or the instruction cache has no way of knowing the word alignment, i.e., where an arbitrary instruction begins and ends, in the cache. Consequently, when the prefetcher requests an instruction, the instruction cache must fetch a large contiguous sequence of data words from the cache. The sequence must be large enough to encompass the longest instruction possible, in order to ensure that all of the data words of the desired instruction is included in the sequence. Unfortunately, this means that the prefetcher cache must then sift through the sequence of data words provided by the cache memory and discard the data words before the desired instruction prior to transferring the instruction to the other elements of the system. This can be a serious limitation in superscalar systems because the prefetcher may have to use several clock cycles to determine the exact beginning and ending of the desired instruction.

Several prior art techniques have been devised to address this problem. The Advanced Micro Devices™ AMD5K86™, and Intel's™ Pentium™ and Pentium Pro™ processors use various schemes for decoding multiple variable-length instructions in parallel. The AMD5K86™ predecodes x86 instructions as they are fetched from memory and written into the instruction cache. In the course of the predecoding, the predecoder adds five bits to each byte prior to writing the byte into the memory. These bits are mainly used to indicate the status of the byte within an instruction. The status records, among other things, whether the byte is at the beginning or at the end of an instruction. A disadvantage of this predecode technique is that the predecode bits increase considerably the size of the instruction cache. Extra hardware is also required to accommodate and process the large number of predecode bits in the AMD5K86™ scheme. See M. Slater, *AMD's K5 Designed to Outrun Pentium*, MICROPROCESSOR REP., vol. 8, no. 14, pp. 1, 6–11, October 1994.

The Pentium™, on the other hand, records instruction boundaries within each line in the instruction cache. The boundaries are recorded in order to support a split-line access feature which permits an instruction that stretches line boundaries to be fetched in a single clock cycle. When an instruction is decoded for the first time, the length of the instruction is fed back to the instruction cache. Each instruction cache directory entry marks instruction boundaries within the line. However, it is not entirely clear how such directory entry marks are maintained and used, i.e., how many bits are used for the marks, whether they are allocated on a data line, data word or instruction basis, where they are stored, etc. See D. ANDERSON, PENTIUM PROCESSOR SYSTEM ARCHITECTURE, 2nd ed. (1995); Intel, A Tour of the Pentium® Pro Processor Microarchitecture (http://intel.com/procs/ppro/info/p6 white/index.htm); and L. Gwennap, Intel's P6 *Uses Decoupled Superscalar Design*, MICROPROCESSOR REP., vol. 9, no. 2, pp. 9–15, February 1995.

Other decoder schemes for superscalar systems are described in U.S. Pat. Nos. 5,202,967; 5,337,415; 5,459,844; and 5,488,746. All of the above-identified patents include significant additional hardware components to accommodate the predecoding, or the storing, of boundary information for variable-byte-length instructions. There is, therefore, a need in the art for decoding multiple, variable-length instructions in a parallel fashion, with minimal additional hardware components, in order to maximize the utility of parallel processing at reduced hardware costs.

SUMMARY OF THE INVENTION

This and other objectives are achieved by the present invention. According to an embodiment, a process is provided for determining the beginning and ending of each instruction of a variable length instruction set. Data lines are stored in a first memory area which illustratively is an instruction cache. Each data line comprises a sequence of data words that are stored at sequential addresses in a main memory. The data lines contain multiple encoded variable length instructions that are contiguously stored in the main memory. Multiple indicators are stored in a second memory area, including one indicator associated with each data word of the data lines stored in the first memory area. Each indicator indicates whether or not its associated data word is the initial data word of a variable length instruction.

According to another embodiment, a sequence of data words is fetched from one or more sequential data lines stored in the cache. The fetched sequence of data words includes a starting data word and at least the number of data words in the longest permissible instruction. Plural indicators (i.e., a vector of indicators) are also fetched from the second memory area including one indicator associated with each of the data words of the fetched sequence. Using the indicators as delimiters of the sequence of to-be-decoded instructions, one or more non-overlapping subsequences of the sequence of data words are identified, wherein each subsequence of data words is comprised in a different, sequential to-be-decoded instruction. Each subsequence of data words is then decoded as a separate instruction.

Illustratively, the length of each instruction is simultaneously separately determined without the use of the indicators of delimiters. These lengths are then compared to the indicators to determine if they are in accord. An instruction sequence is outputted for dispatch to one or more functional units. The instruction sequence includes an initial instruction beginning on a starting data word of the fetched sequence of data words and each other instruction that sequentially follows the initial instruction and is preceded only by one or more instructions for which the fetched vector of indicators accords with the determined lengths. Illustratively, a substitute vector of indicators is generated from the determined lengths. Using the substitute vector of indicators, each of the variable length instructions preceded by one or more instructions for which the fetched vector of indicators failed to accord with the fetched sequence of data words and re-parsed from the sequence of data words and re-decoded.

According to yet another embodiment, a process for updating the indicators is provided. A sequence of one or more to-be-decoded instructions is identified from a sequence of data words fetched from the cache using the vector of indicators fetched from the second memory area. The identified sequence of to-be-decoded instructions is decoded. Simultaneously while decoding the instructions, the initial and final data words of each instruction of the sequence of to-be-decoded instructions are located without use of the indicators. These lengths are used to verify the accuracy of the fetched indicators. Substitute indicators are generated according to the initial and final data words thus located and are stored in the second memory area in place of the retrieved indicators.

Illustratively, a processing system may be implemented with the first and second memory areas. A prefetcher receives the sequence of data words from the first memory area, containing the to-be-decoded instructions, and the vector of indicators from the second memory area. The prefetcher uses the indicators as delimiters to parse out one or more variable length instructions for simultaneous output to multiple decoders. The prefetcher also outputs the vector of indicators and parsed instructions to an instruction length verifier. The instruction length verifier performs a number of tasks simultaneously while the decoders decode the instructions. The instruction length verifier determines the length of each instruction without the use of the indicators. For instance, the instruction length verifier can sift through the sequence of data words in order to determine the lengths (and therefore the initial and final data words) of each instruction. (The instruction length verifier can simultaneously determine the lengths of multiple instructions in a single cycle.) The instruction length verifier outputs a vector of indicators determined from the lengths for storage in the second memory area. The instruction length verifier also causes the re-parsing and re-decoding of those instruction words preceded by one or more instructions for which the indicators did not accord with the instruction lengths. This is achieved by outputting appropriate signals to the prefetcher (including the newly determined vector of indicators) and the decoders.

BRIEF DESCRIPTION OF THE DRAWINGS

A better understanding of the invention will be reached by reading the subsequent detailed description with reference to the drawings wherein:

FIG. 5 is a table representing the array of data words stored in the instruction cache after instructions have been written to the instruction cache;

FIG. 6 is a table representing the array of indicators stored in the instruction boundary memory after instructions have been loaded into the instruction cache;

FIG. 7 is a table representing the array of indicators in the instruction boundary memory after the boundary information for one instruction has been determined; and FIG. 8 is a table representing the array of indicators in the instruction boundary memory after the boundary information has been determined for all instructions in the instruction cache.

DETAILED DESCRIPTION OF THE DRAWINGS

Figure 1:
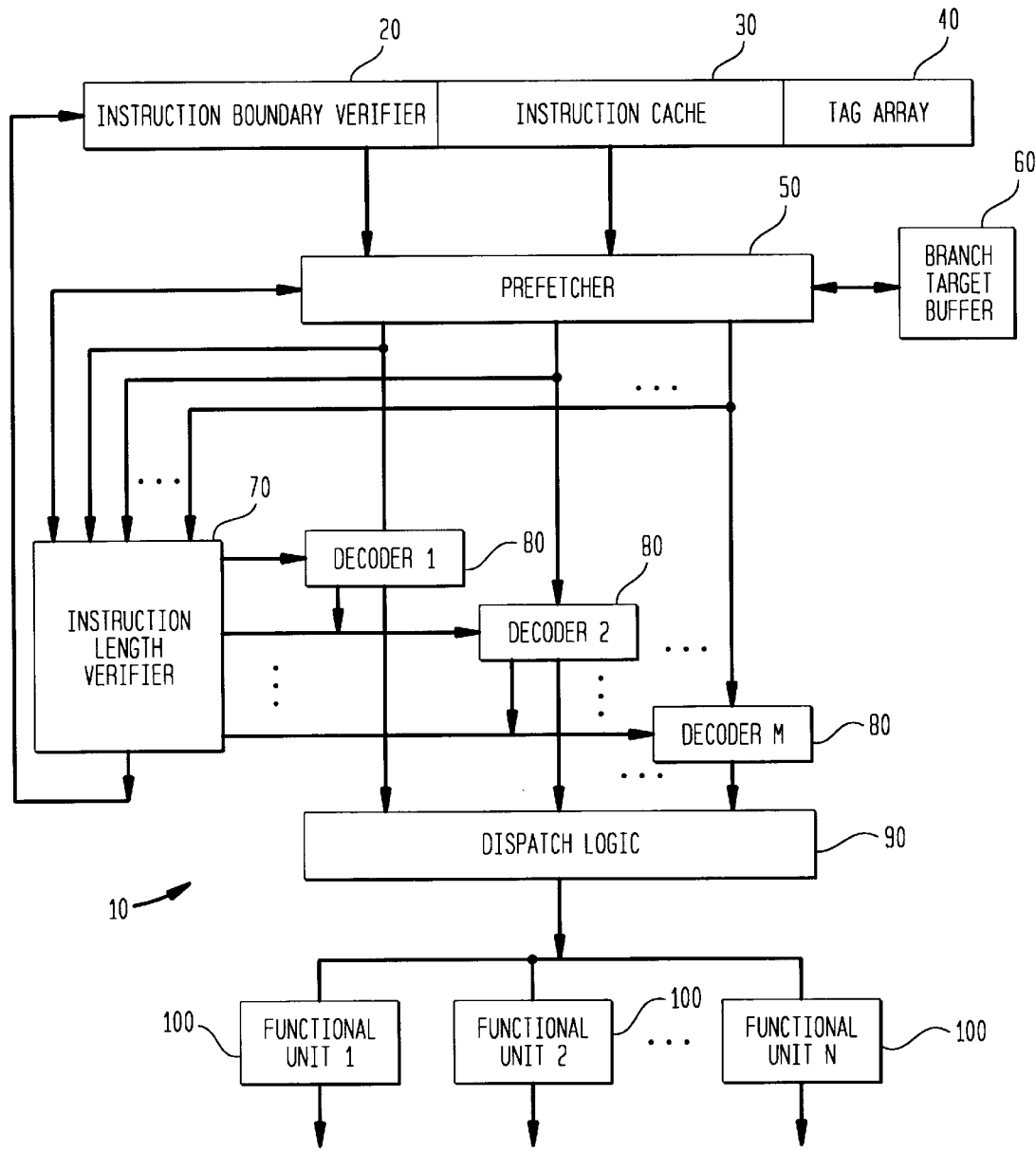
FIG. 1 is a schematic of the digital processing system of the present invention.

As illustrated in FIG. 1, the superscalar, pipelined data processing system 10 illustratively comprises an instruction cache 30, an instruction prefetcher 50, an instruction-length verifier 70, M number of decoders 80 (where M>1), dispatch logic 90, and N functional units 100 (where N>1). The processing system 10 may also contain other components, such as a data cache (not shown). The functional units 100 control parts of the processing system 10 based upon received instructions. Examples of functional units 100 are ALU's and FPU's although a functional unit may be any device that executes instructions.

Illustratively, the processing system 10 also includes an instruction boundary memory 20 and a tag memory 40. The instruction boundary memory 20, instruction cache 30 and tag memory 40 may be implemented as memory areas of a single memory organization or memory areas of separately accessible memory circuits for each of the instruction boundary memory 20, instruction cache 30 and tag memory 40. Illustratively, the instruction cache 30 is organized into fixed length cache line storage locations which each comprise the same number of bytes, e.g., 16 bytes. The tag memory 40 has an array of tags including one tag element corresponding to each cache line storage location of the instruction cache 30. Each tag element includes indicators (bits) which indicate whether the corresponding storage location contains invalid data, valid, but unmodified data, modified valid data, etc. (A description of the operation of caches and data line "ownership", write back schemes and memory coherency is beyond the scope of this patent but may nevertheless be found in U.S. patent application Ser. No. 08/071,721, entitled, "Memory Consistent Preownership Method and System for Transferring Data Between an I/O Device and a Main Memory.") The instruction boundary memory 20 is discussed in greater detail below. In addition, a branch target buffer 60 is connected to the prefetcher 50. The branch target buffer 60 speculates on the outcome of branch instructions and allows additional parallelism of those instructions in certain situations.

1. Structure of the Instruction Boundary and Instruction Cache Arrays

Illustratively, the instruction cache 30 has a V×U, two-dimensional byte array 300 of data words (e.g., bytes) as shown in FIG. 5. The instruction cache array 300 has U data line storage locations with a line size of V data words (e.g., bytes). The most significant data word of each cache line in the instruction cache array 300 is V−1 (310). The least significant data word of each cache line in the instruction cache array 300 is 0 (301). The most significant cache line in the instruction cache array 300 is Line U−1 (359). The least significant cache line in the instruction cache array 300 is Line 0 (351).

Instructions are loaded by reading the entire data line, or data lines containing the instruction (assuming the instruction can potentially span more than one data line) from the main memory and writing the data line into a cache line storage location of the instruction cache. For example, suppose the instructions can be 1–6 data words long, each address is 16 bits long and that the data line size V is 16 bytes. Suppose an instruction at address 0001 0000 0000 0010, i.e., 4098, is to be executed, but is not present in the instruction cache 30. In such a case, the entire data line 4096, including data words 4096–4111, is read out of main memory and stored in the instruction cache 30, e.g., at cache line X. It is known ahead of time that the first data word of the instruction is the third data word of the data line stored in the instruction cache array 300. However, it cannot be known whether the first data word of the sequentially following instruction begins at address 4099, 4100, 4101, 4102, 4103, or 4104 until the length (and thus, the last data word) of the instruction beginning at address 4098 is determined.

To that end, the instruction boundary memory 20 has a V×U, two-dimensional array of indicators 400 as shown in FIGS. 4 and 6–8. Illustratively, each indicator may be implemented with a single bit. Each indicator of the instruction boundary memory 400 corresponds to a unique one of the data wordsstorage locations in the instruction cache array 300. For example, the u=0, v=0 (where $0 \leq u \leq U$ and $0 \leq v \leq V$) indicator corresponds to the data word stored in the cache line 0 at position 0 of the instruction cache array 300, the u=0, v=1 indicator corresponds to the data word stored in the cache line 0 at position 1 of the instruction cache array 300, etc. For an 8-Kilo word instruction cache array 300, one Kilo of indicators (one kilobit) are needed in the indicator array 400 in order to hold the requisite boundary information. Each indicator in the indicator array 400 is used to specify whether the corresponding data word in the instruction cache array 300 is the initial or first data word of an instruction. If a data word is the initial data word of an instruction, then the corresponding indicator bit in the indicator array 400 is illustratively set to 1; otherwise, the indicator bit in the indicator array 400 is set to 0.

The boundary information that the instruction boundary memory 20 writes to the prefetcher 50 is in the form of a vector of indicators, including one indicator bit that corresponds to each data word in the sequence of data words transferred to the prefetcher 50 by the instruction cache 30. The vector of indicators comprises a series of "0" indicator bits and "1" indicator bits where the first "1" indicator bit corresponds to the location of the initial data word of the instruction in the data line outputted by the instruction cache 30. The length of the current instruction corresponds to the separation of the "1" valued indicator for the current instruction (indicating the first data word of the current instruction) and the "1" valued indicator bit for the very next instruction (indicating the first data word of the very next instruction). The prefetcher 50 receives the vector of indicators from the instruction boundary memory 20 and uses the vector of indicators to identify the boundaries of the currently requested instruction. For example, the prefetcher 50 may parse the vector of indicators in order to locate the first "1" valued indicator bit. This first "1" valued indicator bit corresponds to the initial or first data word of the very next instruction to be executed. The prefetcher 50 next locates the second occurring "1" valued indicator bit in the indicator vector indicating the first data word of the immediately succeeding instruction as stored in the data line. Using such information, the prefetcher 50 can determine the length, and more importantly, the last or ending data word of the instruction. Once the beginning and ending memory locations are identified, the data words that make up the complete instruction are known. Illustratively, the prefetcher 50 can parse multiple variable length instructions simultaneously each cycle (i.e., in parallel).

2. Operation of the Instruction Boundary Memory

Figure 2:
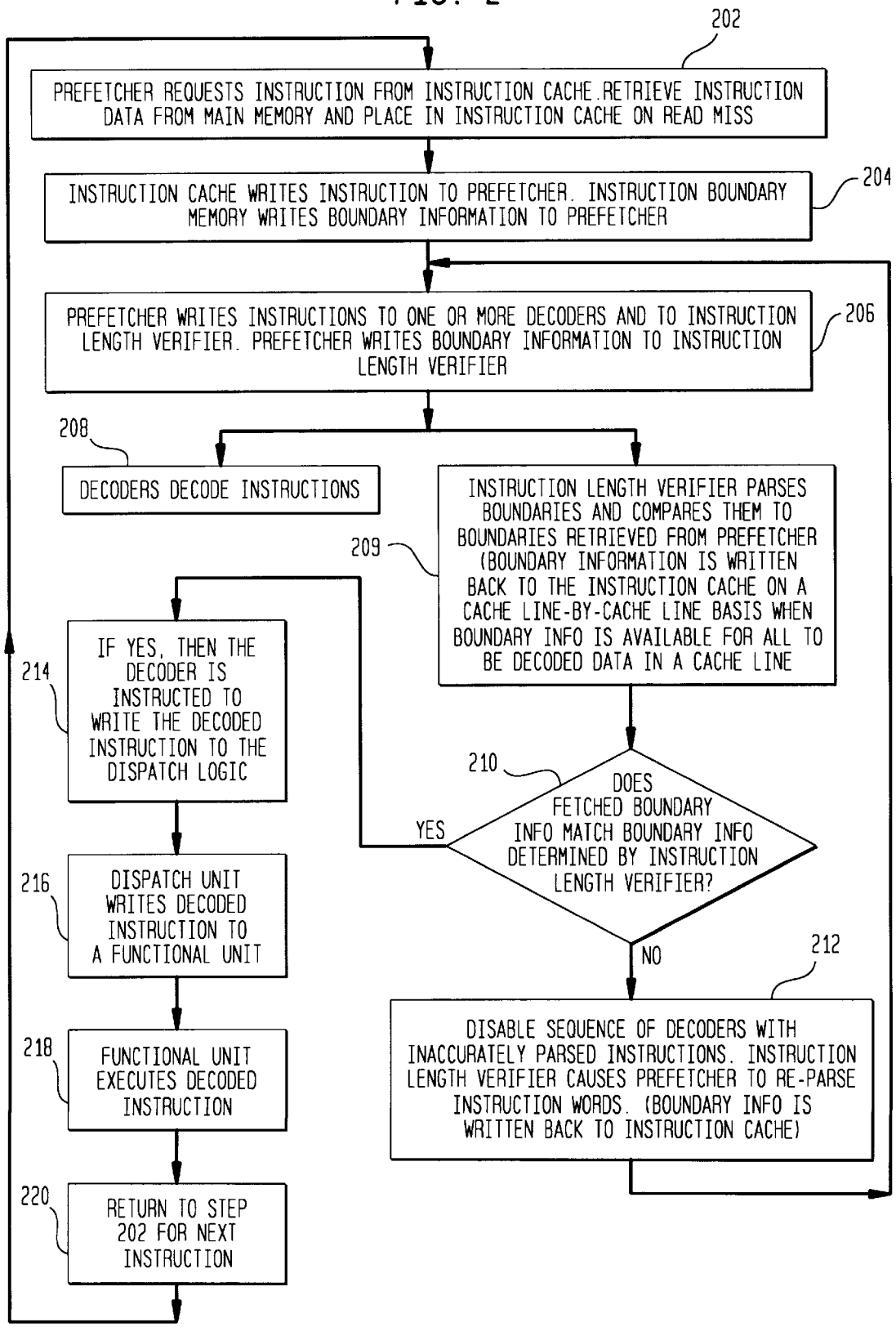
FIG. 2 is a flow chart showing the operation of the digital processing system of the present invention.

The process of executing an instruction and updating the instruction boundary memory 20 is illustrated by the flow chart in FIG. 2. in step 202, the prefetcher 50, requests a sequence of data words (containing one or more instructions) from the instruction cache 30. If there is a "read miss," the cache controller (not shown) will retrieve from the main memory (not shown) one or more data lines containing the requested sequence of data words. If there is a "read hit" in the instruction cache 30, then, according to step 204 of FIG. 2, the instruction cache 30 will fetch a contiguous sequence of data words of the instruction cache array 300 that is large enough to ensure that the entire instruction is included. Such a sequence may include all of the data words from a particular offset within a cache line of the instruction cache 30 plus one or more data words of the first few data words of the very next cache line (where "next" is determined in terms of data line addresses, and not necessarily adjacency in the instruction cache array 300). Note that the consumption rate of the data words by the decoders 80 need not match the production rate of data words by the prefetcher 50. In such a case, the prefetcher 50 can have a buffer in which prefetched data words of instructions are stored pending submission for decoding. In an illustrative embodiment, when the occupancy of data words in the prefetcher 50 buffer drops below a certain level, the prefetcher 50 fetches a fixed number of data words from the instruction cache 30. The prefetcher 50 illustratively "rotates" and packs the data words in the buffer to locate the first data word of the very next instruction and to ensure that the sequence of data words outputted for decoding by the decoders 80 is contiguous. The fetched sequence of data words illustratively is at least as long as the maximum permissible length instruction. At the same time that data words are fetched, the instruction boundary memory 20 will output the boundary information, in the form of a vector of indicators, to the prefetcher 50 to complete step 204 of FIG. 2.

In step 206 of FIG. 2, the prefetcher 50 simultaneously parses out one or more variable length instructions from the sequence of data words. In so doing, the prefetcher 50 consults the vector of indicators in order to divide the retrieved information into separate instructions. As noted above, the prefetcher 50 may search the indicators for the first and second occurring "1" valued indicator bits to determine the first data word of the very next instruction to be executed, and the instruction which immediately follows it. This information parsed out the data words corresponds to the first instruction. Likewise, the prefetcher 50 may search for the third occurring "1" valued indicator bit to determine the ending or last data word of the immediately following instruction, etc. Such "searches" illustratively are not performed linearly, but rather are performed by inputting the vector of indicators to appropriate logic circuits that can extract/parse the sequence of data words into a sequence of one or more separate instructions (Such circuitry is within the ordinary skill in the art and is not reviewed herein for sake of brevity.) Each instruction thus parsed is outputted to a respective decoder 80. Preferably, one sequence of data words is parsed out for each decoder 80. For example, if there are four decoders 80, then four sequences of data words are parsed out. All of the instructions thus parsed out or divided are outputted, along with the vector of indicators, to the instruction length verifier 70. As shown, the decoding by the decoders 80 and the verification of the instruction lengths (more particularly, the accuracy of the vector of indicators) by the instruction length verifier 70 are performed in parallel.

In step 208 of FIG. 2, each decoder 80 attempts to decode its instruction provided by the prefetcher 50. In step 209, which is performed in parallel with step 208, the instruction length verifier 70 verifies the correct instruction length for the instruction provided by the prefetcher 50. In particular, the instruction length verifier 70 may extract each instruction from the sequence of data words and record the initial or first data word of each instruction thus extracted. The instruction length verifier 70 can verify the length of multiple instructions simultaneously (i.e., in parallel). For example, if there are four decoders 80, the prefetcher preferably parses out four subsequences of data words. These four subsequences are received in parallel at the instruction length verifier 70 which simultaneously determines the length of each instruction contained in the subsequences of data words. The lengths of the instructions thus determined identify the boundaries of each instruction. The verified boundary information generated by the instruction length verifier 70 may be formed into a vector of indicators similar to the vector of indicators outputted by the instruction boundary memory 20. The correct, verified boundary information, is written from the instruction length verifier 70 to the instruction boundary memory 20. Advantageously, to reduce the number of writes, the instruction length verifier 70 only writes indicators back to the instruction boundary memory 20 if the indicators retrieved from the instruction boundary memory 20 contained errors.

Note that there is no guarantee that the vector of indicators initially fetched from the instruction boundary memory 20 to the prefetcher 50 accurately indicates whether or not the corresponding data words are the first data words of instructions contained in the fetched sequence of data words. Such an inaccuracy can arise in several instances. First, there is no requirement, that the instruction data words remain unaltered during execution (e.g., self-modifying codes). Second, a cache line storage location for a data line in the instruction cache 30 can be over-written with a different data line (i.e., from a different location in main memory) in accordance with a write back or cache flushing scheme. In such a case, the corresponding vector of indicators may be reset (i.e., each indicator bit associated with the cache line storage location of the instruction cache 30 is reset to the value "0"). In any event, no instruction boundary information is available for the newly written data line (and certainly, the current values of the indicator bits will not likely accurately reflect the boundaries of instructions contained in the cache line storage location of the cache). Third, when the CPU 10 is initialized, the indicators stored in the array 400 are reset. Note that the above scheme can become quite complicated since the cache flushes or writes back data on a data line basis whereas the sequence of data, and respective vector of indicators, provided to the prefetcher 50 need not be aligned within their respective data lines, or entirely contained within a single cache line storage location of the instruction cache 30. Note also that the branch target buffer 60 is continually outputting predicted outcomes of executed branch instructions. Such predictions can indicate that execution will branch to a data line that has been invalidated, e.g., flushed out of the instruction cache 30, over-written by another data line, etc. thereby increasing the occurrence of the above-noted second situation, albeit infrequently.

Note also that the starting and ending data words of an instruction need not be aligned with the data line boundary. This is a function of the tight packing of the variable length instructions and branch instructions that can cause branching to instructions that begin on any data word within a data line. As noted above, the prefetcher 50 can fetch a discontinuous sequence of data words beginning in the middle of a data line. When the prefetcher 50 does so, the prefetcher 50 must record the starting data word position of such data lines. After the instruction length verifier 70 determines the vector of boundary indicators, they are written back to the instruction boundary memory 20 using the starting data word position stored in the prefetcher 50. In the case that the fetched sequence of data words spans more than one data line, multiple writes illustratively may be needed to write back the vector of boundary indicators, including one write for each data line that the fetched sequence of data words spans. Consider that the use of multiple decoders 80 can increase the length of the fetched sequence of data words and, therefore, the number of data lines spanned by the fetched sequence of data words. This in turn can increase the number of write operations performed by the instruction length verifier 70 in writing back the vector of indicators. A buffer may be needed to hold pending writes if multiple writes are necessary to store the vector of indicators and the instruction boundary memory 20 is not fast enough to execute each write operation as it issues. Of course, the buffering will not introduce any errors, although it might reduce the potential for parallel decoding. Likewise, the instruction boundary memory 20 need not be updated if the retrieved vector of boundary indicators is verified as correct by the instruction length verifier 70. This advantageously reduces the number of writes performed on the instruction boundary memory 20.

Furthermore, note that the outputted vector of indicators may not include all of the indicators corresponding to a complete data line but just the indicators corresponding to only the part of a data line retrieved for decoding. Circuitry is illustratively provided to perform such partial updates.

According to step 210, the instruction length verifier 70 compares the boundary information provided by the prefetcher 50 (i.e., the vector of indicators originally supplied by the instruction boundary memory 20) to the verified length of the instruction as determined by the instruction length verifier 70. Assume first that the verified instruction length confirms the boundary information provided by the prefetcher 50 (e.g., the beginning data words, and lengths of the instructions, as determined by the instruction length verifier 70 are equivalent to the beginning data words designated by the vector of indicators initially outputted from the instruction boundary memory 20). In such a case, the instruction length verifier 70 outputs an enable signal to each decoder 80 receiving the first decoded instruction or a decoded instruction preceded by only instructions for which the length determined by the instruction length verifier 70 accords with the indicators used to parse out the decoded instruction. The enable signal enables the decoders 80 to transfer their decoded instructions to the dispatch logic 90 according to step 214.

Now assume that the instruction length determined by the instruction length verifier 70 does not match, or accord with, the boundary information fetched from the instruction boundary memory 20 (i.e., the boundary information was missing, incomplete, or incorrect). In such a case, the instruction length verifier 70, according to step 212, outputs a disable signal to each decoder 80 receiving an instruction that is preceded by one or more instructions that were parsed using indicators that do not agree with the lengths determined by the instruction length verifier 70.

Note that the initial data word of the first sequence of data words is also the initial data word from which the sequences of data words are parsed. Thus, the initial data word of the first instruction formed from the initial data sequence is always correctly aligned. Hence, the first instruction can always be decoded by the decoder 80 which receives the initial data sequence. It is also possible that the initial data word of the second sequence of data words following the initial sequence is also correctly aligned with the start of the second instruction. In such a case, the first and the second instructions may be decoded by a respective decoder 80 and so on. In general, the first non-aligned sequence of data words is identified by the instruction length verifier 70. (Note that the first non-aligned sequence of data words cannot be the initially parsed sequence of data words.) The instruction length verifier 70 then disables the decoder 80 which decodes this non-aligned sequence of data words and each decoder 80 that receives a sequence of data words parsed after this first non-aligned sequence of data words. This is because a presumption is made that all sequences of data words parsed after the first non-aligned sequence are also non-aligned.

The disablement of the appropriate decoders 80 can be achieved in a number of ways. Illustratively, the parsed instruction words are outputted to a sequence of decoders 80. If one of the decoders 80 is to be disabled (because it received a non-aligned sequence of data words), then each decoder 80 receiving a subsequently parsed data word is also disabled. Illustratively, this is achieved by the disabled decoder 80 communicating a disabling signal to the sequentially following decoder 80 (which receives the sequentially following sequence of data words). Such a disabling signal propagates therefrom to the next decoder 80 which received a sequentially following instruction, etc. The instruction length verifier 70 furthermore simultaneously causes the prefetcher 50 to re-parse the instruction(s) from the sequence of data words using the (updated) boundary information and output the re-parsed information to the decoder(s) 80. Note that the correct boundary information is transferred by the instruction length verifier 70 to the prefetcher 50 in this step.

Step 216 assumes that the boundary information was correct, that valid instructions have been decoded by decoders 80 and that the decoded instructions have been written to the dispatch logic 90 according to step 214. In step 216, the dispatch logic 90 determines which functional unit 100 is to execute each decoded instruction. Depending upon the instruction, such as an instruction to perform a floating point operation, an instruction to perform a branch test and address calculation, etc., a particular functional unit will be utilized. Superscalar processors may include one or more functional units 100. In that case, at least one of the functional units 100 is simultaneously chosen to execute instructions in parallel if possible. The functional units 100 can support the same functions, or some subset of the functional units 100 can support an overlapping subset of functions. Advantageously, two or more of the functional units 100 can simultaneously execute frequently used instructions thereby increasing instruction level execution parallelism. Once the functional units 100 are chosen, the dispatch logic 90 transfers the decoded instructions to the functional units 100. According to step 218, the functional units 100 execute the decoded instructions. Step 220 causes the above process to be repeated until all of the required instructions have been executed.

Note that while steps 202–220 are indicated in sequence, they can be performed by the respective units in parallel according to the pipelined processing paradigm.

3. Examples

The structure, function, and updating of the instruction boundary memory 20 is best illustrated by the following series of examples.

A. Upon Power-Up or Replacement of an Instruction Cache Data Line

Figures 3, 4:
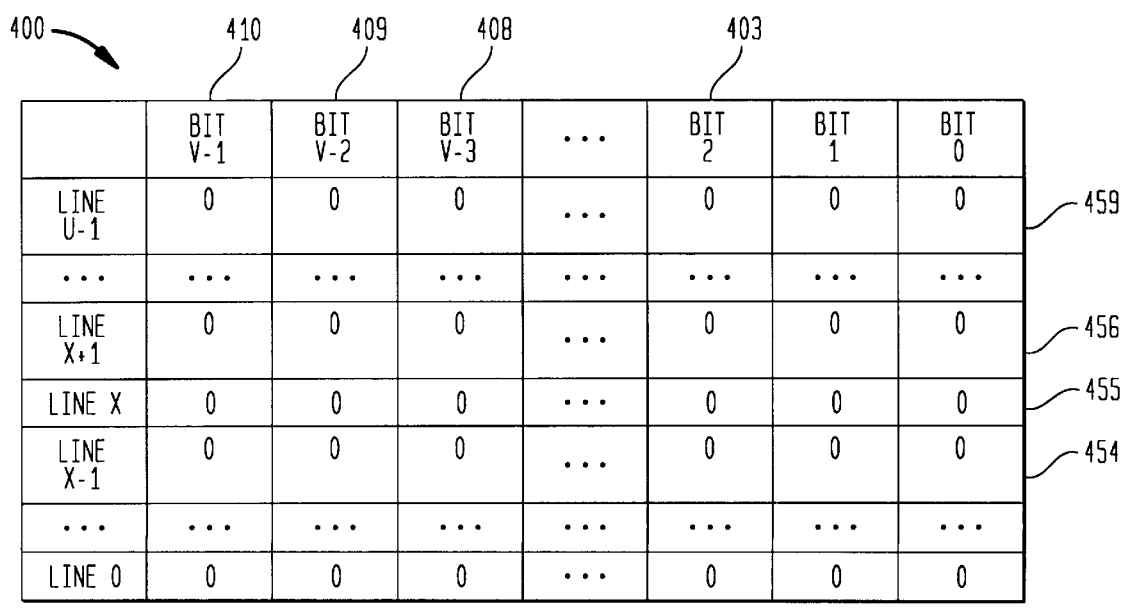
FIG. 3 is a table representing the array of data line tags stored in the tag array in a cleared (power up) state.
FIG. 4 is a table representing the array of indicators stored in the instruction boundary memory in a cleared (power up or refresh) state.

All valid indicators in the data line tag array 40 and indication array 400 are reset to "0" (i.e., "cleared") after the power is turned on. Cleared indication array 400 is shown in FIG. 4 and cleared data line tag array 40 is shown in FIG. 3. Moreover, when an instruction cache line, such as instruction cache line 359, is replaced or marked invalid, the corresponding vector of indications, such as corresponding indication array row 459, is reset to "0".

B. Initial Fetch of an Instruction and Initial Loading of the Indication Array

In this example, the instruction cache array 300 has been loaded with instructions as shown in FIG. 5. Various instructions can be seen in cache array lines 351, and 354–356 of FIG. 5. Cache line 359 of FIG. 5 does not contain any instructions. This is because its corresponding valid/invalid bit in the data line tag array 40 is cleared indicating that the cache line 359 contains invalid data. (Cache line 359 could theoretically store any arbitrary data which would be invalid and meaningless. For sake of clarity and simplicity, the cache line 359 is shown as storing only zero valued data.) Each instruction is contained in contiguous data words in one or more cache lines of the cache array 300. Illustratively, the instructions are shown as occupying sequentially ordered and contiguous cache lines 355, 356. For example, one five-data word instruction starts in data line u=X (355) at data word v=V−2 (309) and ends in data line u=X+1 (356) at data word v=2 (303) of FIG. 5. The previous instruction, i.e. the one that comes before the aforementioned five data-word instruction, ends at data word v=V−3 of data line u=X (355) and starts at data word v=1 (302) of data line u=X (355). The instruction after the aforementioned five-data word instruction starts at data word v=3 (not shown) of Line u=X+1 (356) and ends at data word v=V−2 (309) of line u=X+1 (356) as shown in FIG. 5. However, this is not the only or typical manner in which the instructions are stored in the cache. Rather the data lines that contain a sequence of instructions may be stored in non-sequential and/or non-contiguous cache line storage locations of the instruction cache 300 depending on, among other things, the cache organization (e.g., set-associative) and replacement policy.

When execution begins, the prefetcher 50 is only provided with the memory address of the first data word of the current instruction to be executed (which may be available from a program counter, not shown). No information is provided as to the number of data words, or address of the last data word of the very next instruction, and no information is available as to the address of the first data word of any subsequent instruction. Therefore, the prefetcher 50 can obtain the five-data word instruction by requesting a sequence of data words including the first data word and a number of data words following the first data word such that at least the maximum number of data words that can be provided in an instruction are fetched. In this case, assume that the sequence includes the data words from cache line X (355), data word V−2 (309) through data word 3 (not shown) of cache line X+1 (356).

At the same time that the instruction cache 30 transfers the instruction to the prefetcher 50, the instruction boundary memory 20 will transfer a vector of indicators that correspond to each of the data words in the instruction cache array 300 that are transferred to the prefetcher 50. In this example, however, the indicator array 400 remains in its powered up, or cleared state, with all indicator bits set to "0". Consequently, all of the indicator bits in this example (from indicator bit V−2 (409) of row X (455) to indicator bit 3 (not shown) of row X+1 (456)) are currently set to "0", indicating that no boundary information is available for the requested instruction.

As noted above, the prefetcher 50 has no way of determining whether or not it has accurate information. Rather, the indicator bits are fed to logic circuitry therein which extracts (albeit, in this case, erroneously) the requested instruction from the received sequence of data words using the indicators as delimiters as to where the instructions end (and in the case of multiple instructions, where they begin). The (erroneously) parsed data words of the desired instruction are outputted to one of the decoders 80. Note, however, that the first data word of the first instruction is known. Thus, a primary decoder 80 receiving the subsequence of data words beginning with the first data word can still decode the first instruction (as described below) even though the indicators are incorrect.

While the decoder 80 is decoding the instruction, the instruction length verifier 70 determines whether or not the instruction provided by the prefetcher 50 was correctly parsed by verifying its length against the instruction boundary information in the indicator bits. To that end, the instruction length verifier 70 receives the instructions outputted to each decoder 80 and the indicators. If the instruction length verifier 70 determines that the indicators accurately delimit the instruction based on a separate verification of the instruction length, the instruction length verifier 70 enables all of the decoders 80 to output the decoded instructions to the dispatch logic 90. In this case, the indicators do not accurately indicate the length length instructions decoded by the decoders 80. Thus, the instruction length verifier 70 outputs a disabling signal to the decoders 80 (other than the primary decoder 80 receiving the first instruction) which have been provided sequences of data words that are not aligned with the initial data word of an instruction. On the other hand, the primary decoder 80 has been provided a sequence of data words of a first instruction aligned with the first data word (of the first instruction). If the primary decoder 80 is provided a sequence of data words equal in length to the maximum length instruction, the primary decoder 80 can always decode the first instruction regardless of whether or not the indicators are correct. Similarly, suppose the length of the first instruction is verified as correct but the length of the second instruction is not verified as correct. In such a case, the sequence of data words of the second instruction are nevertheless aligned with the start of the second instruction (although the sequence of data words for the third instruction are not aligned with the start of the third instruction). In this latter case, both the first and the second instruction can be decoded by their respective decoders 80, and so on.

The disabled decoders 80 refrain from outputting decoded instructions to the dispatch logic 90. The instruction length verifier 70 also outputs the correct vector of indicators to the instruction boundary memory 20 for storage in the indicator array 400. The corrected indicator bits are also outputted to the prefetcher 50 along with a signal causing the prefetcher 50 to re-parse those instructions preceded by one or more instructions for which the instruction length verifier 70 could not verify the length and were not decoded.

Upon receiving the instruction starting data word memory location and the appropriate indicator bit vector from the instruction length verifier 70, the instruction boundary memory 20 stores the indicator bit vector in the appropriate locations. In this case, indicator bits v=V−1 (410) and V−2 (409) on row u=X (455) and indicator bits v=0 through v=2 (not shown) on Line u=X+1 (456) are changed '01' and '000,' respectively. In other words, the indicators are updated to reflect that the first instruction was five data words long. The instruction length verifier 70 illustratively performs the updating on a cache line by cache line basis. Thus, the subsequence '01' of the indicator bits determined for the most significant two bytes of cache line X may be updated immediately. This is illustrated in FIG. 7. However, the instruction length verifier 70 illustratively defers updating the subsequence '000' of the indicator bits until all of the to-be-processed data words in the cache line X+1 are decoded and indicator bits are obtained therefor. This is illustrated in FIG. 8. For example, the updating of indicator bits can be deferred until the last data word of a cache line is decoded or until a branch is taken to an instruction in another cache line. In either case, the decoding of data words in a particular cache line ceases. Until such time, each time indicator bits are produced, they are concatenated to any indicator bits not yet updated this time to form a sequence of vector bits for the cache line by the instruction length verifier 70.

Note that upon re-parsing the instructions, the prefetcher 50 uses the correct boundary information as supplied by the instruction length verifier 70. Thus, the subsequent comparison by the instruction length verifier 70 will indicate that the instructions are correct. In that case, the instruction length verifier 70 will signal each decoder 80, for which the length of the respective decoded instruction is verified, to output the re-decoded instruction to the dispatch logic 90 for subsequent execution by a functional unit 100. At the same time, the instruction length verifier 70 signals the prefetcher 50 that the current instructions were valid and to process the next instruction.

In the process of fetching and re-fetching various instructions from the instruction cache 30, the instruction length verifier 70 will gradually update the instruction boundary memory 20. Note that a single instruction was to be fetched and decoded above simply for sake of illustration. Advantageously, multiple instructions are fetched and decoded by the prefetcher 50 simultaneously. Thus, the incremental determination of boundary information is achieved much more rapidly. Once all of the instructions in the instruction cache 30 have been fetched and the lengths thereof determined at least once (by the instruction length verifier 70), then all of the boundary information for those instructions will be available in the instruction boundary memory 20. FIG. 8 shows an indicator array 400 containing boundary information for each instruction contained in the instruction cache array 300 shown in FIG. 5. As mentioned before, the present invention takes considerable advantage of the spatial and temporal locality of reference property of instructions. Given the fact that the "hit" ratio in the instruction cache 30 in a processor usually exceeds 90%, the success rate of using the present invention for parallel decoding of multiple instructions is reasonably high.

C. Execution of Instructions Using Instruction Boundary Memory Information

In this example, the instruction cache array 300 remains unchanged from the previous example. The contents of the instruction cache array 300 are shown in FIG. 5. However, each of the instructions in the instruction cache 30 has been fetched at least once, so that the boundary information in the boundary information array 20 accurately reflects the beginning (and ending) of each corresponding instruction in the instruction cache array. The instruction boundary information for the indicator array 400 is shown in FIG. 8. The situation of accurate information being located in the indicator array 400 is typical due to the temporal and spatial locality of reference property of instructions in a superscalar processing system.

As before, various instructions can be seen in cache array data line storage locations 351, 354–356 of FIG. 5. Data line storage location 359 of FIG. 5 does not contain any instructions. Each instruction is contained in contiguous data words in one or more data line storage locations of the cache array 300. For example, one five-data word instruction ends in data line storage location X+1 (356) at data word 2 (303) and starts on data line storage location X (355) at data word V−2 (309) of FIG. 5. The previous instruction before the aforementioned five-data word instruction ends at data word V−3 (308) of data line storage location X (355) and starts at data word 1 (302) of data line X (355). The instruction after the aforementioned five-data word instruction ends at data word V−2 (309) of data line storage location X+1 (356) and starts at data word 3 (not shown) of data line X+1 (356).

As in the previous example, when the prefetcher 50 requests the five-data word instruction, the prefetcher 50 does so by requesting the series of data words from data line storage location X+1 (356), data word 3 (not shown) through, e.g., data word V−2 (309) of data line storage location X (355)). This ensures that the longest instruction word can be extracted from the sequence of fetched data words.

At the same time that the instruction cache 30 outputs the instruction to the prefetcher 50, the instruction boundary memory 20 outputs the vector of indicators corresponding to the sequence of the data words outputted from the instruction cache array 300 to the prefetcher 50. In this example, the contents of the indicator vector array 400 are shown in FIG. 8, and include two "1" bits that indicate the beginning of the requested instruction and the beginning of the very next instruction. The prefetcher 50 uses the vector of indicators, specifically, the relative locations of the "1" indicator bits, to parse the next instruction word from the sequence of data words. The use of the boundary information provided by the instruction boundary memory 20 can decrease significantly the time needed to retrieve a requested instruction and provide it to a decoder 80, especially where multiple instructions are to be fetched in parallel. Consider that the vector of indicators indicates the delimiters of each instruction in the subsequence and can be used to simultaneously parse or divide out each of the instructions.

While the decoder 80 is decoding the instruction parsed by the prefetcher 50, the instruction length verifier 70 verifies the length of the instruction provided by the prefetcher 50 against the vector of indicators. If the instruction is preceded only by instructions whose corresponding lengths, as independently determined by the instruction length verifier 70 (from the sequence of data words alone), accords with the instruction boundaries as indicated by the vector of indicators, the instruction length verifier 70 enables the decoder 80 that received the instruction to output the decoded instruction to the dispatch logic 90. (Note that parsing, decoding and verifying a single instruction is described in this example. The instruction length verifier 70 is capable of simultaneously verifying the length of each of the parsed sequences of data words outputted by the prefetcher 50 on any given cycle.)

The forgoing is a description of the arrangement and the operation of an embodiment of the invention. The scope of the invention is considered to include the described embodiment together with others obvious to those skilled in the art.

The claimed invention is:

1. In a processor that decodes and executes multiple instructions of varying length in a single cycle, a process for determining the beginning and ending of each instruction comprising:
    (a) storing data lines in a cache, each data line comprising a sequence of data words that are stored at sequential addresses in a main memory, said data lines comprising multiple encoded variable length instructions that are contiguously stored in said memory,
    (b) storing in a memory, a plurality of indicators, including one indicator associated with each data word of said data lines, that indicates whether or not said associated data word is the initial data word of a variable length instruction,
    (c) fetching a contiguous sequence of data words of a plurality of data lines of said cache, and at least one vector of indicators, including one indicator associated with each of said data words of the fetched sequence,
    (d) using said indicators of said at least one vector as delimiters of contiguous data words contained in said fetched sequence of data words originating from said plurality of data lines, parsing said sequence into one or more variable length instructions, in parallel,
    (e) decoding a sequence of each of said parsed variable length instructions in parallel, and
    (f) simultaneously while performing said step (e), determining the length of each of said variable length instructions without the use of said vector of indicators, and determining whether or not said vector of indicators accords with said determined lengths.

2. The method of claim 1 further comprising the step of:
    (c) in response to initializing said processor, resetting said indicators stored in said memory so as to refrain from indicating that any data word is the initial data word of a variable length instruction.

3. The method of claim 1 further comprising the step of:
    (g) outputting an instruction sequence for dispatch to one or more functional units, said instruction sequence including an initial instruction beginning on a starting data word of said fetched sequence of data words and each other instruction that sequentially follows said initial instruction and is preceded only by one or more instructions for which said vector of indicators accords with said determined lengths.

4. The method of claim 3 further comprising the steps of:
    (h) generating a substitute vector of indicators from said determined lengths, and
    (i) using said substitute vector of indicators, re-parsing from said fetched subsequence of data words, and re-decoding, each of said variable length instructions preceded by one or more instructions for which said fetched vector of indicators failed to accord with said determined lengths.

5. The method of claim 3 further comprising the steps of:
    (h) dispatching each of said simultaneously outputted decoded instructions to one or more of a plurality of functional units, and
    (i) executing each decoded instruction in parallel in said one or more functional units to which a decoded instruction is dispatched.

6. The method of claim 2 further comprising the steps of:
    (e) determining the length of each of said instructions without the use of said indicators,
    (f) generating a substitute vector of indicators from said determined lengths, and (g) storing said substitute vector of indicators in said memory in place of said fetched vector of indicators.

7. The method of claim 6 wherein said step (g) further comprises the steps of:
   (g1) dividing said vector of indicators into a first plurality of subsequences of indicators wherein each subsequence of indicators corresponds to a different one of said data lines and includes each indicator of said vector associated with a data word of said corresponding data line, and
   (g2) storing each of said subsequences of indicators during separate storing steps.

8. The method of claim 7 further comprising:
   (g3) deferring step (g2) for each subsequence of indicators until said steps (c), (e) and (f) are performed on a data line other than said data line corresponding to said subsequence for which said step (g2) is deferred,
   (g4) performing steps (c), (e), (f) and (g1) for a second subsequence of data words to obtain a second vector of indicators and a second plurality of subsequences of indicators, and
   (g5) concatenating subsequences of indicators from said first and second plurality of subsequences corresponding to the same data line.

9. The method of claim 1 further comprising the steps of:
   (c) in response to over-writing a data line in said cache memory or invalidating a data line in said cache memory, resetting each indicator associated with each of said data words of said over-written or invalidated data line so as to refrain from indicating that any of said data words of said over-written or invalidated data line is the initial data word of a variable length instruction.

10. In a processor that decodes and executes multiple instructions of varying length in a single cycle, a process for decoding one or more instructions comprising:
    (a) fetching a sequence of data words of a plurality of sequential data lines stored in a cache, including a sequence of at least the maximum number of data words in the longest permissible instruction, starting from a starting data word,
    (b) fetching a plurality of indicators from said cache, including one indicator associated with each of said data words of said fetched sequence, each of said indicators indicating whether or not said respective data word is the initial data word of an instruction,
    (c) using said indicators as delimiters of said sequence of to-be-decoded instructions, identifying one or more non-overlapping subsequences of said sequence of data words, wherein each subsequence of data words, originating from said plurality of sequential data lines, is comprised in a different, sequential to-be-decoded instruction,
    (d) decoding each subsequence data words as a separate instruction, and
    (e) simultaneously while performing said step (b), locating the initial and final data words of each instruction of said sequence of to-be-decoded instructions without use of said indicators, and verifying the accuracy of said indicators.

11. In a processor that decodes and executes multiple instructions of varying length in a single cycle, a process for decoding one or more instructions comprising:
    (a) identifying a sequence of one or more to-be-decoded instructions from a sequence of data words of a plurality of data lines of a cache that includes each data word of said sequence of to-be-decoded instructions, utilizing a plurality of indicators retrieved from a memory, including one indicator associated with each data word of said sequence of data words originating from said plurality of data lines, that indicates whether or not said associated data word is the initial data word of an instruction,
    (b) decoding said identified sequence of to-be-decoded instructions,
    (c) simultaneously while performing said step (b), locating the initial and final data words of each instruction of said sequence of to-be-decoded instructions without use of said indicators, and verifying the accuracy of said indicators, and
    (d) generating substitute indicators according to said initial and final data words located in said step (c) and storing said substitute indicators in said memory in place of said retrieved indicators.

12. A processing system that decodes and executes multiple instructions of varying length in a single cycle, and which determines the initial and final data words of each instruction comprising:
    (a) a first cache memory area that stores data lines which each comprises a sequence of data words that are stored at sequential addresses in a main memory, said data lines comprising multiple encoded variable length instructions that are contiguously stored in said memory,
    (b) a second memory area that stores a plurality of indicators, including one indicator associated with each data word of said data lines, that indicates whether or not said associated data word is the initial data word of a variable length instruction,
    (c) a prefetcher that fetches a contiguous sequence of data words of a plurality of data lines of said cache, and at least one vector of indicators, including one indicator associated with each of said data words of the fetched sequence, and uses said indicators of said at least one vector as delimiters of contiguous data words contained in said fetched sequence of data words originating from said plurality of data lines, to parse said sequence into one or more variable length instructions, in parallel,
    (d) a plurality of decoders which each decodes a different one of said parsed variable length instructions in parallel, and
    (e) an instruction length verifier which simultaneously while said decoders decode said parsed variable length instruction words, determines the length of each of said instructions without the use of said vector of indicators, and determines whether or not said vector of indicators accords with said determined lengths.

13. The processing system of claim 12 wherein in response to initializing said processing system, said second memory area resets said indicators stored therein so as to refrain from indicating that any data word is the initial data word of a variable length instruction.

14. The processing system of claim 12,
    wherein said decoders that decode an instruction sequence, including an initial instruction that begins on a starting data word of said fetched sequence of data words, and each other instruction that sequentially follows said initial instruction and is preceded only by one or more instructions for which said vector of indicators accords with said determined lengths, receive enable signals from said instruction length verifier that enable said decoders to output each decoded instruction for dispatch to one of a plurality of functional units.

15. The processing system of claim 14 wherein said instruction length verifier generates a substitute vector of indicators from said determined lengths, wherein said prefetcher uses said substitute vector of indicators to re-parse from said fetched subsequence of data words each of said variable length instructions preceded by one or more instructions for which said fetched vector of indicators failed to accord with said determined lengths, and wherein said decoders re-decode said re-parsed instructions in parallel.

16. The processing system of claim 14 further comprising:
   (f) dispatch logic which dispatches each of said simultaneously outputted decoded instructions to one or more of a plurality of functional units, and
   (g) a plurality of functional units which executes each decoded instruction in parallel.

17. The processing system of claim 12 further comprising:
   (d) an instruction length verifier which determines the length of each of said instructions without the use of said indicators, and generates a substitute vector of indicators from said determined lengths,
      wherein said second memory area stores said substitute vector of indicators in said memory in place of said fetched vector of indicators.

18. The processing system of claim 17 wherein said instruction length verifier divides said vector of indicators into a first plurality of subsequences of indicators, wherein each subsequence of indicators corresponds to a different one of said data lines and includes each indicator of said vector associated with a data word of said corresponding data line, and stores each of said subsequences of indicators during a separate storing step.

19. The processing system of claim 18 wherein said instruction length verifier defers storing each subsequence of indicators until said instruction length verifier generates a substitute vector of indicators for at least one instruction in a data line other than said data line corresponding to said subsequence for which said instruction length verifier defers storing, and
   wherein said instruction length verifier obtains a second vector of indicators and a second plurality of subsequences of indicators, and, concatenates subsequences of indicators from said first and second plurality of subsequences corresponding to the same data line.

20. The processing system of claim 12 wherein in response to said first memory area over-writing a data line therein or invalidating a data line therein, said second memory area resets each indicator associated with each of said data words of said over-written or invalidated data line so as to refrain from indicating that any of said data words of said over-written or invalidated data line is the initial data word of a variable length instruction.

21. A processing system that decodes and executes multiple instructions of varying length in a single cycle and which decodes one or more instructions comprising:
   (a) a cache which stores sequential data lines of data words containing a plurality of variable length instructions contiguously stored therein,
   (b) a memory which stores a plurality of indicators that indicate whether or not each of said data words of said data lines stored in said cache are the initial data word of a variable length instruction,
   (c) a prefetcher which fetches a sequence of data words of a plurality of sequential data lines stored in said cache, including a starting data word and at least the number of data words in the longest permissible instruction, which fetches a plurality of indicators from said cache, including one indicator associated with each of said data words of said fetched sequence, and which uses said indicators as delimiters of said sequence of to-be-decoded instructions to identify one or more non-overlapping subsequences of said sequence of data words, wherein each subsequence of data words, originating from said plurality of sequential data lines, is comprised in a different, sequential to-be-decoded instruction,
   (d) a plurality of decoders including one decoder that decodes each subsequence of data words as a separate variable length instruction, in parallel, and
   (e) an instruction length verifier which, simultaneously while said decoders decode said instructions of said sequence, locates the initial and final data words of each instruction of said sequence of to-be-decoded instructions without use of said indicators, which verifies the accuracy of said indicators, and which generates substitute indicators according to said initial and final data words.

22. A processing system that decodes and executes multiple instructions of varying length in a single cycle comprising:
   (a) a prefetcher which identifies a sequence of one or more to-be-decoded instructions from a sequence of data words of a plurality of data lines of a cache that includes each data word of said sequence of to-be-decoded instructions, utilizing a plurality of indicators retrieved from a memory, including one indicator associated with each data word of said sequence of data words originating from said plurality of data lines, that indicates whether or not said associated data word is the initial data word of an instruction,
   (b) a plurality of decoders that decode each instruction of said identified sequence of to-be-decoded instructions, in parallel,
   (c) an instruction length verifier which, simultaneously while said decoders decode said instructions of said sequence, locates the initial and final data words of each instruction of said sequence of to-be-decoded instructions without use of said indicators, which verifies the accuracy of said indicators, and which generates substitute indicators according to said initial and final data words, and
   (d) a memory which stores said substitute indicators in place of said retrieved indicators.

* * * * *